(12) United States Patent
Lee

(10) Patent No.: US 10,522,839 B2
(45) Date of Patent: Dec. 31, 2019

(54) ELECTRONIC DEVICE INCLUDING BATTERY WITH NOTCH FORMED IN AT LEAST A PORTION OF UNCOATED PART OF THE BATTERY

(71) Applicant: Samsung Electronics Co., Ltd., Gyeonggi-do (KR)

(72) Inventor: Yeonil Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/414,209

(22) Filed: May 16, 2019

(65) Prior Publication Data
US 2019/0355994 A1    Nov. 21, 2019

(30) Foreign Application Priority Data

May 16, 2018   (KR) ........................ 10-2018-0056107

(51) Int. Cl.
| | | |
|---|---|---|
| *H01M 4/78* | (2006.01) | |
| *H01M 10/04* | (2006.01) | |
| *H04M 1/02* | (2006.01) | |
| *G06F 1/16* | (2006.01) | |
| *H01M 4/02* | (2006.01) | |

(52) U.S. Cl.
CPC ............ *H01M 4/78* (2013.01); *G06F 1/1626* (2013.01); *H01M 10/0431* (2013.01); *H04M 1/0262* (2013.01); *H04M 1/0264* (2013.01); *H01M 2004/021* (2013.01); *H01M 2220/30* (2013.01)

(58) Field of Classification Search
CPC .... H01M 4/78; H01M 4/70; H01M 2004/025; H01M 2004/027; H01M 2004/028; H01M 4/0404; H01M 2220/30; H01M 10/0431; B05D 5/12; G06F 1/1626; H04M 1/0262; H04M 1/0264

See application file for complete search history.

(56) References Cited

U.S. PATENT DOCUMENTS

| | | | | |
|---|---|---|---|---|
| 2003/0134192 A1* | 7/2003 | Katsumoto | ......... | H01M 2/0202 429/176 |
| 2005/0233214 A1* | 10/2005 | Marple | ............... | H01M 2/1653 429/221 |
| 2005/0238951 A1* | 10/2005 | Yoo | ....................... | H01M 2/263 429/122 |
| 2005/0277023 A1* | 12/2005 | Marple | ............... | H01M 2/1653 429/221 |

(Continued)

FOREIGN PATENT DOCUMENTS

| | | |
|---|---|---|
| KR | 1020060037594 | 5/2006 |
| KR | 1020110058658 | 6/2011 |

(Continued)

OTHER PUBLICATIONS

International Search Report dated Aug. 22, 2019 issued in counterpart application No. PCT/KR2019/005833, 8 pages.

*Primary Examiner* — Devan A Sandiford
(74) *Attorney, Agent, or Firm* — The Farrell Law Firm, P.C.

(57) ABSTRACT

Disclosed is a battery mounted in an electronic device and having a notch structure patterned on an uncoated part, thereby reinforcing the bond between the partitioning films of the battery and providing a structure robust to external stress and enhanced for stabilized battery performance.

20 Claims, 10 Drawing Sheets

(56) References Cited

U.S. PATENT DOCUMENTS

| | | | |
|---|---|---|---|
| 2006/0024578 A1* | 2/2006 | Lee | H01M 2/18 429/208 |
| 2006/0093910 A1* | 5/2006 | Yoon | H01M 2/263 429/209 |
| 2006/0222945 A1* | 10/2006 | Bowden | H01M 4/382 429/224 |
| 2006/0275666 A1* | 12/2006 | Chang | H01M 10/0431 429/223 |
| 2007/0009793 A1* | 1/2007 | Kim | H01M 2/06 429/175 |
| 2008/0026291 A1* | 1/2008 | Kim | H01M 2/0285 429/211 |
| 2009/0061304 A1* | 3/2009 | Muraoka | H01M 2/00 429/163 |
| 2009/0280406 A1* | 11/2009 | Kozuki | H01M 2/263 429/209 |
| 2010/0233519 A1* | 9/2010 | Cheon | H01M 2/34 429/56 |
| 2011/0123857 A1* | 5/2011 | Hwang | H01M 2/0212 429/185 |
| 2011/0269011 A1* | 11/2011 | Park | H01M 2/0413 429/158 |
| 2012/0208055 A1 | 8/2012 | Ahn | |
| 2014/0045041 A1* | 2/2014 | Kim | H01M 10/0431 429/163 |
| 2014/0147716 A1 | 5/2014 | Oh et al. | |
| 2015/0340732 A1* | 11/2015 | Kim | H01M 10/052 429/94 |
| 2016/0013455 A1* | 1/2016 | Shiu | H01M 2/021 361/679.26 |
| 2016/0141587 A1 | 5/2016 | Suh et al. | |
| 2018/0108942 A1 | 4/2018 | Oh | |
| 2018/0131009 A1 | 5/2018 | Suehiro et al. | |
| 2018/0241071 A1 | 8/2018 | Son et al. | |
| 2018/0337392 A1 | 11/2018 | Lee et al. | |

FOREIGN PATENT DOCUMENTS

| | | |
|---|---|---|
| KR | 1020120092367 | 8/2012 |
| KR | 1020160059777 | 5/2016 |
| KR | 1020160137429 | 11/2016 |
| KR | 1020170000257 | 1/2017 |
| KR | 1020180004588 | 1/2018 |
| KR | 1020180041314 | 4/2018 |

* cited by examiner

ELECTRONIC DEVICE INCLUDING BATTERY WITH NOTCH FORMED IN AT LEAST A PORTION OF UNCOATED PART OF THE BATTERY

CROSS-REFERENCE TO RELATED APPLICATION(S)

This application is based on and claims priority under 35 U.S.C. § 119 to Korean Patent Application No. 10-2018-0056107, filed on May 16, 2018, in the Korean Intellectual Property Office, the disclosure of which is incorporated by reference herein in its entirety.

BACKGROUND

1. Field

The disclosure relates generally to electronic devices, and more particularly, to an uncoated part structure of a battery mounted in an electronic device.

2. Description of Related Art

The term "electronic device" indicates a device performing a particular function according to its equipped program, such as a home appliance, an electronic scheduler, a portable multimedia player, a mobile communication terminal, a tablet personal computer (PC), a video/sound device, a desktop PC or laptop computer, or a navigation for automobile. For example, electronic devices may output stored information as voices or images, are highly integrated, and provide high-speed, high-volume wireless communication. As an example of such an electronic device, a mobile communication terminal has been recently equipped with various functions.

An electronic device has a rechargeable secondary battery, such as a nickel-cadmium battery, polymer battery, or lithium ion battery. Lithium ion batteries are useful for portable devices by their memory effect-free and high-capacity properties. For example, lithium ion batteries are manufactured by coating a rectangular base with a battery active material in a predetermined area and shape and attaching electrode tabs on the uncoated surface.

A battery mounted in an electronic device may be produced in such a manner that an uncoated surface (e.g., an uncoated part) of the electrodes, which is not coated with an active material, is surrounded by a partitioning film. The uncoated parts between the positive sheet and the negative sheet disposed at the outermost edge of the battery, although facing each other, cannot maintain a strong bond with the partitioning film Therefore, the partitioning film between the positive sheet and the negative sheet may be peeled off or the electrodes may be misaligned by external stress to the battery, such as when the battery drops or falls on a surface such as a floor. For example, the uncoated is metallic base surfaces of the positive and negative sheets are unable to have a strong bond with the binder components of the partitioning film and, thus, are prone to deform or peel off Repeated external stress may result in a short circuit or fire and heating inside the battery, deteriorating the stability of the battery.

As such, there is a need in the art for a battery surface that alleviates the tendency of such battery surfaces to separate under external stresses or even under routine use.

SUMMARY

An aspect of the disclosure is to address at least the above-mentioned problems and/or disadvantages and to provide at least the advantages described below. Accordingly, an aspect of the disclosure is to provide a battery mounted in an electronic device and having a notch structure patterned on an uncoated part, thereby reinforcing the bond between the partitioning films and providing a structure robust to external stress.

Another aspect of the disclosure is to provide a battery mounted in an electronic device that due to reinforcing the bond between the partitioning films, balances charged energy in the battery cells and stabilizes battery performance.

Another aspect of the disclosure is to a battery mounted in an electronic device and designed to have a structure robust against an external impact and a drop impact, thereby improving the safety of the battery and suppressing the occurrence of product liability.

In accordance with an aspect of the disclosure, a battery includes a negative electrode sheet including a negative electrode part coated with a negative electrode active material and a first uncoated part disposed adjacent to the negative electrode part, a positive electrode sheet facing the negative electrode sheet and including a positive electrode part coated with a positive electrode active material and a second uncoated part disposed adjacent to the positive electrode part, and at least one partitioning film disposed on a surface of the negative electrode sheet or a surface of the positive electrode sheet, wherein the positive electrode sheet, the negative electrode sheet, and the partitioning film include a roll shape formed by wrapping, and wherein at least a portion of the first uncoated part of the negative electrode sheet or the second uncoated part of the positive electrode sheet includes at least one internally recessed notch structure.

In accordance with another aspect of the disclosure, an electronic device includes a battery and includes a housing including a front plate facing in a first direction, a rear plate facing in a second direction opposite to the first direction, and a bracket formed to surround a space between the front plate and the rear plate, a display device configured to externally display information through at least a portion of the front plate, and the battery mounted in a seating hole prepared in at least a portion of a first surface facing in the first direction of the bracket, wherein the battery includes a negative electrode sheet including a negative electrode part coated with a negative electrode active material and a first uncoated part disposed adjacent to the negative electrode part, a positive electrode sheet facing the negative electrode sheet and including a positive electrode part coated with a positive electrode active material and a second uncoated part disposed adjacent to the positive electrode part, and at least one partitioning film disposed on a surface of the negative electrode sheet or a surface of the positive electrode sheet, wherein at least a portion of the first uncoated part of the negative electrode sheet or the second uncoated part of the positive electrode sheet includes at least one internally recessed notch structure.

BRIEF DESCRIPTION OF THE DRAWINGS

The above and other aspects, features, and advantages of certain embodiments of the disclosure will be more apparent from the following detailed description taken in conjunction with the accompanying drawings, in which.

Throughout the drawings, like reference numerals will be understood to refer to like parts, components, and structures.

DETAILED DESCRIPTION

Figure 1:
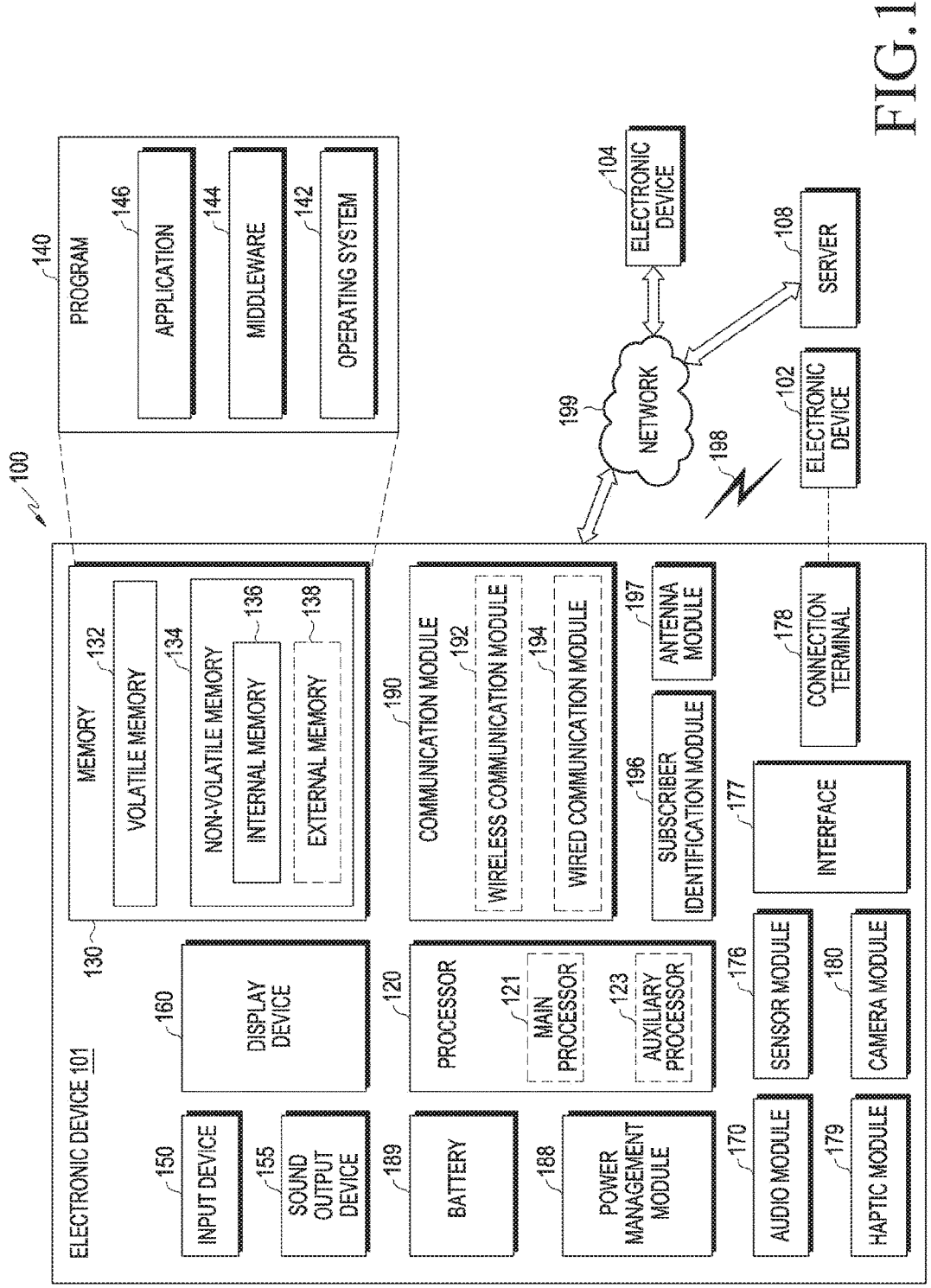
FIG. 1 illustrates an electronic device in a network environment according to embodiments.

Hereinafter, embodiments of the disclosure will be described in detail with reference to the accompanying drawings. Detailed descriptions of known functions and configurations incorporated herein will be omitted when it may make the subject matter of the present disclosure rather unclear.

The terms described below are defined in consideration of functions in the disclosure and thus may vary depending on users, operator's intention, or convention. Therefore, the definitions of the terms should be made based on the contents throughout the specification.

The electronic device according to embodiments may be one of various types of electronic devices including a portable communication device, such as a smart phone, a computer device, a portable multimedia device, a portable medical device, a camera, a wearable device, or a home appliance, although the electronic devices are not limited to these devices.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if a first element is referred to, with or without the term "operatively" or "communicatively", as "coupled with," "coupled to," "connected with," or "connected to" a second element, the first element may be coupled with the second element directly (e.g., wiredly), wirelessly, or via a third element.

As used herein, the term "module" may include a unit implemented in hardware, software, or firmware, and may interchangeably be used with other terms such as "logic," "logic block," "part," or "circuitry". A module may be a single integral component, or a minimum unit or part thereof, adapted to perform one or more functions, and may be implemented in a form of an application-specific integrated circuit (ASIC).

FIG. 1 illustrates an electronic device 101 in a network environment 100 according to embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The, and may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. At least one of the display device 160 and the camera module 180 of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160.

The processor 120 may execute a program 140 to control at least one other hardware or software component of the electronic device 101 coupled with the processor 120, and may perform various data processing or computation. As at least part of the data processing or computation, the processor 120 may load a command or data received from the sensor module 176 or the communication module 190 in a volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component among the components of the electronic device 101, instead of the main processor 121 while the main processor 121 is in an inactive (e.g., sleep) state, or together with the main processor 121 while the main processor 121 is in an active state. The auxiliary processor 123 may be implemented as part of another component functionally related to the auxiliary processor 123.

The memory 130 may store various data used by at least one component of the electronic device 101. The various data may include the program 140 and input data or output data for a command related thereto. The memory 130 may include at least one of the volatile memory 132 and the non-volatile memory 134.

The program 140 may be stored in the memory 130 as software, and may include an operating system (OS) 142, middleware 144, and at least one application 146.

The input device 150 may receive a command or data to be used by another component of the electronic device 101, such as from a user of the electronic device 101.

The input device 150 may include a microphone, a mouse, or a keyboard.

The sound output device 155, such as a speaker or receiver, may output sound signals to the outside of the electronic device 101. The speaker may be used for general purposes, such as playing multimedia or playing record, and the receiver may be used for an incoming calls and may be implemented as separate from, or as part of the speaker.

The display device 160 may visually provide information to a user of the electronic device 101 and may include a display, a hologram device, or a projector and control circuitry to control a corresponding one of the display, hologram device, and projector. The display device 160 may include touch circuitry adapted to detect a touch, or a pressure sensor adapted to measure the intensity of force incurred by the touch.

The audio module 170 may convert a sound into an electrical signal and vice versa, and may obtain the sound via the input device 150, or output the sound via the sound output device 155 or a headphone of an external electronic device 102 wiredly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include but is not limited to a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device 102 wiredly or wirelessly, and may include a high definition multimedia interface (HDMI), a universal serial bus (USB) interface, a secure digital (SD) card interface, or an audio interface.

A connecting terminal 178 may include a connector by which the electronic device 101 may be physically connected with the external electronic device 102, such as an HDMI connector, a USB connector, an SD card connector, or an audio connector, such as a headphone connector.

The haptic module 179 may convert an electrical signal into a mechanical stimulus (e.g., a vibration or motion) or electrical stimulus which may be recognized by a user via his tactile sensation or kinesthetic sensation. The haptic module 179 may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101 and may be implemented as at least part of a power management integrated circuit (PMIC).

The battery 189 may supply power to at least one component of the electronic device 101 and may include a primary cell which is not rechargeable, a secondary cell which is rechargeable, or a fuel cell.

The communication module 190 may support establishing a wired or a wireless communication channel between the electronic device 101 and the external electronic device, such as the electronic device 102, the electronic device 104, or the server 108, and performing communication via the established communication channel. The communication module 190 may include one or more communication processors that are operable independently from the processor 120 wired or wireless communication, and may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198, such as a short-range communication network including Bluetooth™, wireless-fidelity (Wi-Fi) direct, or infrared data association (IrDA)) or the second network 199, such as a long-range communication network including a cellular network, the Internet, or a LAN or wide area network (WAN). These various types of communication modules may be implemented as a single chip, or may be implemented as multiple chips separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the external electronic device and may include one or more antennas from which at least one antenna appropriate for a communication scheme used in the communication network, such as the first network 198 or the second network 199, may be selected by the communication module 190. The signal or the power may then be transmitted or received between the communication module 190 and the external electronic device via the selected at least one antenna.

At least some of the above-described components may be coupled mutually and communicate commands or data therebetween via an inter-peripheral communication scheme, such as a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or service related to the request, and transfer an outcome of the performed function or request to the electronic device 101, which may provide the outcome, with or without further processing of the outcome, as at least part of a reply to the request. To that end, a cloud computing, distributed computing, or client-server computing technology may be used.

Figure 2:
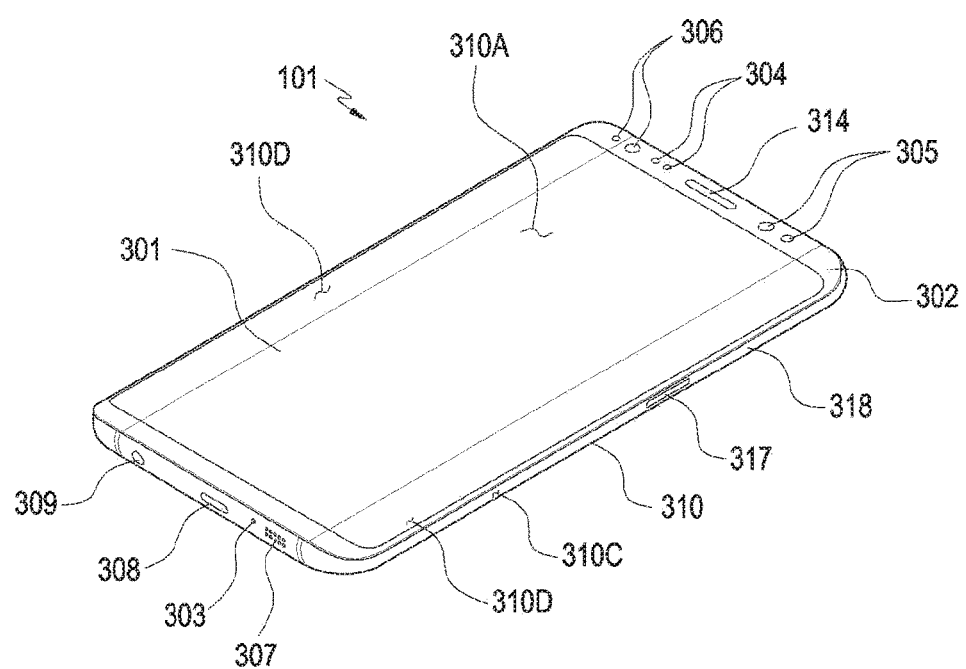
FIG. 2 is a front perspective view illustrating an electronic device according to an embodiment.
Figure 3:
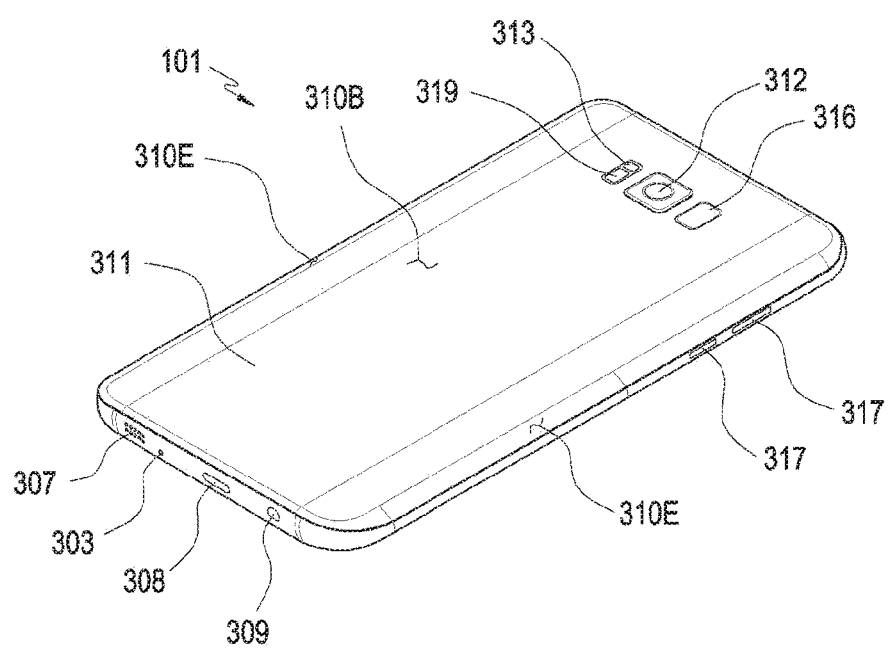
FIG. 3 is a rear perspective view illustrating an electronic device according to an embodiment.

FIG. 2 is a front perspective view illustrating an electronic device 101 according to an embodiment. FIG. 3 is a rear perspective view illustrating an electronic device 101 according to an embodiment.

Referring to FIGS. 2 and 3, an electronic device 101 may include a housing 310 with a first (or front) surface 310A, a second (or rear) surface 310B, and a side surface 310C surrounding a space between the first surface 310A and the second surface 310B. According to another embodiment, the housing may denote a structure forming part of the first surface 310A, the second surface 310B, and the side surface 310C of FIG. 1.

At least part of the first surface 310A may have a substantially transparent front plate 302 (e.g., a glass plate or polymer plate including various coat layers). The second surface 310B may be formed of a substantially opaque rear plate 311 laminated or colored glass, ceramic, polymer, metal (e.g., aluminum, stainless steel (STS), or magnesium), or a combination of at least two thereof. The side surface 310C may be formed by a side bezel structure (or a "side member") 318 that couples to the front plate 302 and the rear plate 311 and includes a metal and/or polymer. The rear plate 311 and the side bezel plate 318 may be integrally formed together and include the same material, such as aluminum.

The front plate 302 may include two first regions 310D, which seamlessly and bendingly extend from the first surface 310A to the rear plate, on both the long edges of the front plate 302. In FIG. 3, the rear plate 311 may include second regions 310E, which seamlessly and bendingly extend from the second surface 310B to the front plate, on both the long edges. The front plate 302 or the rear plate 311 may include only one of the first regions 310 or the second regions 310E, or the first regions 310D or the second regions 301E may partially be excluded. At a side view of the electronic device 101, the side bezel structure 318 may have a first thickness (or width) for sides that do not have the first regions 310D or the second regions 310E and a second thickness, which is smaller than the first thickness, for sides that have the first regions 310D or the second regions 310E.

The electronic device 101 may include at least one or more of a display 301, audio modules 303, 307, and 314, sensor modules 304, 316, and 319, camera modules 305, 312, and 313, key input devices 317, a light emitting device 306, and connector holes 308 and 309. The electronic device 101 may exclude at least one f the components or may add other components.

The display 301 may be exposed through the front plate 302. At least a portion of the display 301 may be exposed through the front plate 302 forming the first surface 310A and the first regions 310D of the side surface 310C. The edge of the display 301 may be formed to be substantially the same in shape as an adjacent outer edge of the front plate 302. The interval between the outer edge of the display 301 and the outer edge of the front plate 302 may remain substantially even to afford a larger area of exposure to the display 301.

The screen display region of the display 301 may have a recess or opening in a portion thereof, and at least one or more of the audio module 314, sensor module 304, camera module 305, and light emitting device 306 may be aligned with the recess or opening. At least one or more of the audio module 314, sensor module 304, camera module 305, fingerprint sensor 316, and light emitting device 306 may be included on the rear surface of the screen display region of the display 301, which may be disposed to be coupled with, or adjacent, a touch detecting circuit, a pressure sensor capable of measuring the strength (pressure) of touches, and/or a digitizer for detecting a magnetic field-type stylus pen. At least part of the sensor modules 304 and 119 and/or at least part of the key input device 317 may be disposed in the first regions 310D and/or the second regions 310E.

The audio modules 303, 307, and 314 may include a microphone hole 303 and speaker holes 307 and 314. The microphone hole 303 may have a microphone inside to obtain external sounds, and there may be a plurality of microphones to be able to detect the direction of a sound. The speaker holes 307 and 314 may include an external speaker hole 307 and a phone receiver hole 314, and the microphone hole 303 may be implemented as a single hole, or speakers may be rested without the speaker holes 307 and 314 (e.g., piezo speakers).

The sensor modules 304, 316, and 319 may generate an electrical signal or data value corresponding to an internal operating state or external environmental state of the electronic device 101 and may include a first sensor module 304 (e.g., a proximity sensor), a second sensor module (e.g., a fingerprint sensor) disposed on the first surface 310A of the housing 310, a third sensor module 316 (e.g., a heart-rate monitor (HRM) sensor), and/or a fourth sensor module 316 (e.g., a fingerprint sensor) disposed on the second surface 310B of the housing 310. The fingerprint sensor may be disposed on the second surface 310B as well as on the first surface 310A of the housing 310. The electronic device 101 may further include at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, as well as an illuminance sensor 304.

The camera modules 305, 312, and 313 may include a first camera device 305 disposed on the first surface 310A of the electronic device 101, and a second camera device 312 and/or a flash 313 disposed on the second surface 310B. The camera modules 305 and 312 may include one or more lenses, an image sensor, and/or an image signal processor. The flash 313 may include a light emitting diode (LED) or a xenon lamp. Two or more lenses (an infrared (IR) camera, a wide-angle lens, and a telescopic lens) and image sensors may be disposed on one surface of the electronic device 101.

The key input device 317 may be disposed on the side surface 310C of the housing 310. The electronic device 101 may exclude all or some of the above-mentioned key input devices 317 and the excluded key input devices 317 may be implemented in other forms, such as soft keys, on the display 301. The key input device may include the sensor module 316 disposed on the second surface 310B of the housing 310.

The light emitting device 306 may be disposed on the first surface 310A of the housing 310, and may provide information about the state of the electronic device 101 in the form of light. The light emitting device 306 may provide a light source that interacts with the camera module 305. The light emitting device 306 may include a light emitting device (LED), an infrared (IR) LED, or a xenon lamp.

The connector holes 308 and 309 may include a first connector hole 308 for receiving a universal serial bus (USB) connector for transmitting or receiving power and/or data to/from an external electronic device and/or a second connector hole 309, such as, an earphone jack, for receiving a connector for transmitting or receiving audio signals to/from the external electronic device.

Figure 4:
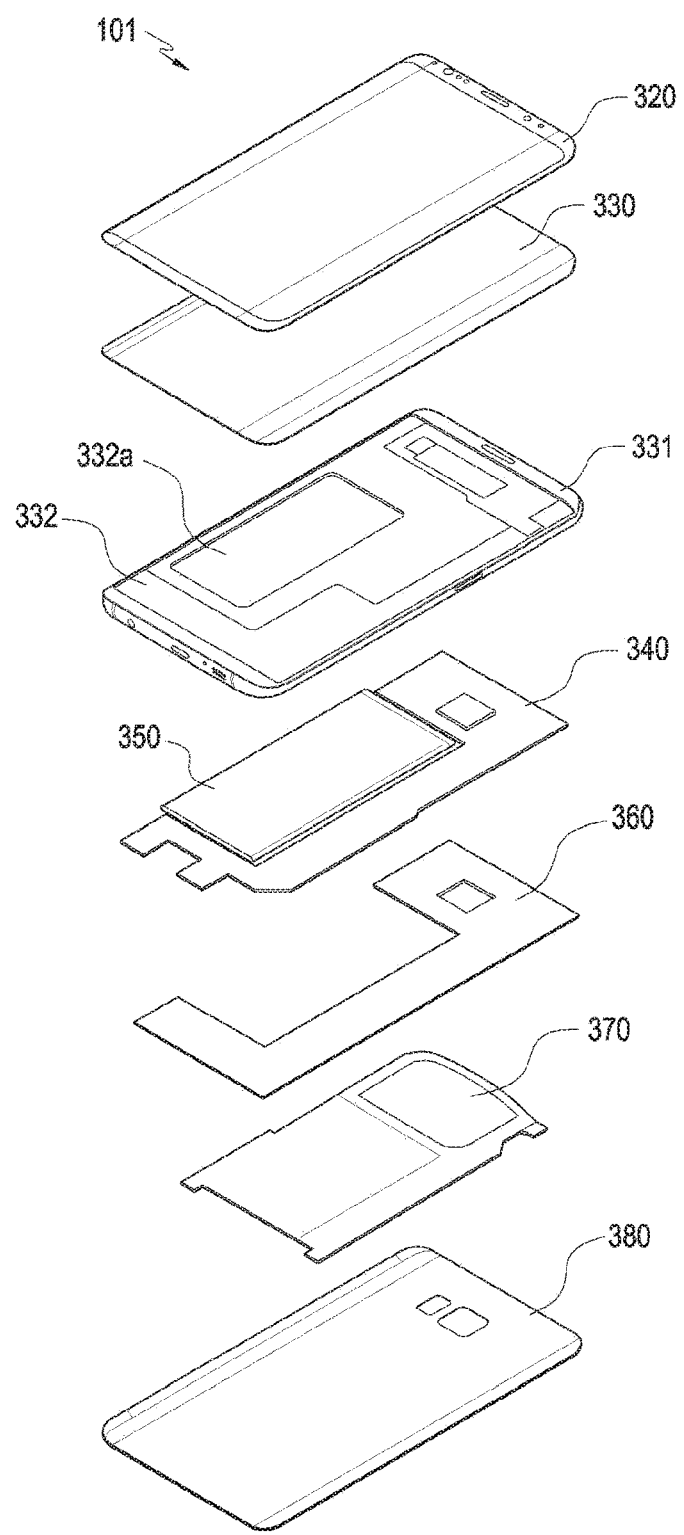
FIG. 4 is an exploded perspective view illustrating an electronic device according to an embodiment.

FIG. 4 is an exploded perspective view illustrating an electronic device 101 according to an embodiment.

Referring to FIG. 4, an electronic device 101 may include a side bezel structure 331, a first supporting member 332 (e.g., a bracket), a front plate 320, a display 330, a printed circuit board (PCB) 340, a battery 350, a second supporting member 360 (e.g., a rear case), an antenna 370, and a rear plate 380. The electronic device 101 may exclude at least one of the components or may add other components. The first supporting member 332 may be disposed inside the electronic device 101 to be connected with the side bezel structure 331 or integrated with the side bezel structure 331, and may be formed of a metal and/or non-metallic material (e.g., polymer). The display 330 may be joined onto one surface of the first supporting member 332, and the printed circuit board 340 may be joined onto the opposite surface of the first supporting member 311. A processor, memory, and/or interface may be mounted on the printed circuit board 340 and may include one or more of a central processing unit, an application processor, a graphic processing device, an image signal processing, a sensor hub processor, or a communication processor.

The memory may include a volatile or non-volatile memory.

The interface may include a high definition multimedia interface (HDMI), a universal serial bus (USB) interface, a secure digital (SD) card interface, and/or an audio interface, may electrically or physically connect the electronic device 101 with an external electronic device, and may include a USB connector, an SD card/multimedia card (MMC) connector, or an audio connector.

The battery 350 may be a device for supplying power to at least one component of the electronic device 101, and may include a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 101.

The antenna 370 may be disposed between the rear plate 380 and the battery 350, may include a near-field communication (NFC) antenna, a wireless charging antenna, and/or a magnetic secure transmission (MST) antenna, and may perform short-range communication with an external device or may wirelessly transmit or receive power necessary for charging. An antenna structure may be formed by a portion or combination of the side bezel structure 331 and/or the first supporting member 332.

Figure 5:
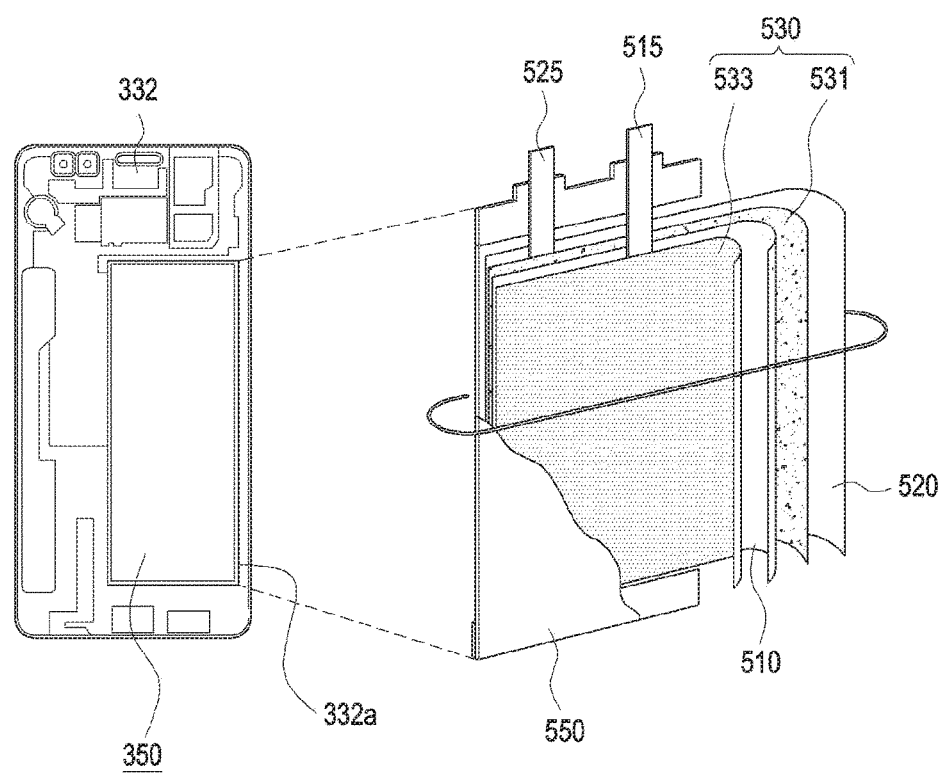
FIG. 5 is an exploded perspective view illustrating a battery mounted in an electronic device according to an embodiment.
Figure 6:
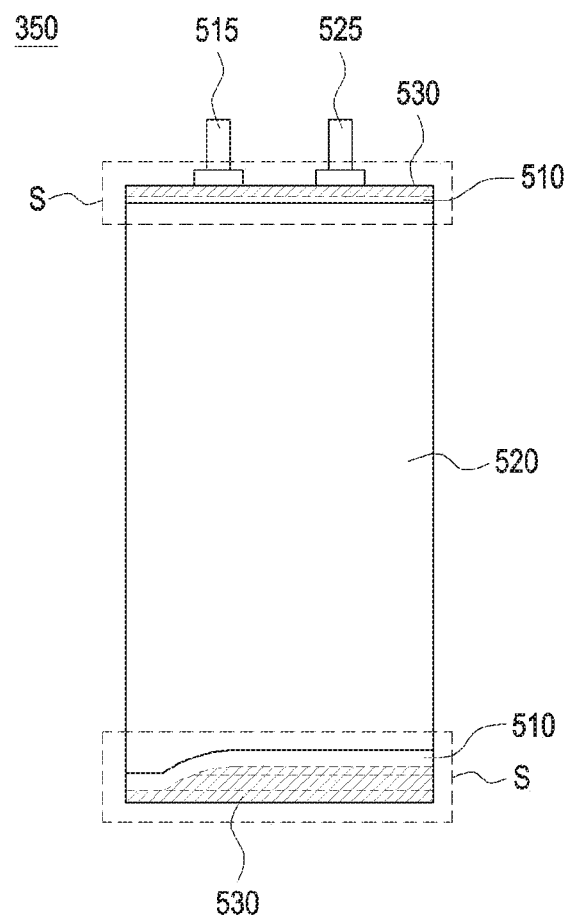
FIG. 6 is a front view illustrating an external surface of a battery according to an embodiment.

FIG. 5 is an exploded perspective view illustrating a battery 350 mounted in an electronic device according to an embodiment. FIG. 6 is a front view illustrating an external surface of a battery 350 according to an embodiment. For ease of description, FIG. 6 illustrates a negative electrode sheet 510 at the top and bottom areas S of a battery 350 in a see-through manner although they are hidden by partitioning films 530 and, thus, not exposed to the outside.

The battery 350 may be seated in a seating hole 332a formed in a first supporting member 332 of an electronic device and may include the negative electrode sheet 510, a positive electrode sheet 520, and at least one partitioning film 530 as an electrode assembly. As another example, the battery 350 may include a pouch 550 to receive the electrode assembly.

The battery 350 may have a wrapped structure and the negative electrode sheet 510 formed on one surface of the at least one partitioning film 530 and the positive electrode sheet 520 disposed on the opposite surface thereof. The negative electrode sheet 510, the at least one partitioning film 530, and the positive electrode sheet 520 together may be wrapped in a roll shape. For example, the electrode assembly of the battery 350 may be a flexible jelly roll-type secondary battery that may be reversibly bent, and may be produced in such a jelly roll shape that the negative electrode sheet 510, the positive electrode sheet 520, and the at least one partitioning film 530 between the negative electrode sheet 510 and the positive electrode sheet 530 are stacked one over another and wrapped.

The battery 350 may be produced in a circular or elliptical shape by wrapping the negative electrode sheet 510, the partitioning film 530, and the positive electrode sheet 520, and one surface of the battery 350 may be prepared in a flat rectangular shape corresponding to the shape of the seating hole 332a.

The negative electrode sheet 510 and the positive electrode sheet 520 of the battery 350 may be disposed to face each other in shapes corresponding to each other. A negative electrode tab 515 externally protrudes from one side of the negative electrode sheet 510. A positive electrode tab 525 externally protrudes from one side of the positive electrode sheet 520. The negative electrode tab 515 and the positive electrode tab 525 may protrude in lengths corresponding to each other and be spaced apart from each other while facing each other.

The negative electrode tab 515 prepared on the negative electrode sheet 510 may be formed on an uncoated part of the negative electrode sheet 510 which is free from a negative electrode active material. The positive electrode tab 525 prepared on the positive electrode sheet 520 may be formed on an uncoated part of the positive electrode sheet 520 which is free from a positive electrode active material.

There may be provided a plurality of partitioning films 530 which may be disposed on the innermost layer of the jelly roll-type battery 350 and between the negative electrode sheet 510 and the positive electrode sheet 520, and may support the battery 350 while simultaneously preventing a contact between the negative electrode sheet 510 and the positive electrode sheet 520.

At least one notch structure may be recessed to the inside in one side of the uncoated part of the negative electrode sheet 510 or the positive electrode sheet 520, and may be prepared in such a shape that at least part of the uncoated part is cut off. The at least one notch structure may be formed in the negative electrode sheet 510 alone or in the positive electrode sheet 520 alone, or may be formed in the negative electrode sheet 510 and the positive electrode sheet 520.

The pouch 550 may receive and seal off the, the electrode assembly from the outside, may be filled with an electrolyte and have electrodes immersed therein, or may be structured to have an internal space or formed of an insulating member that wraps the electrode assembly.

Figure 7:
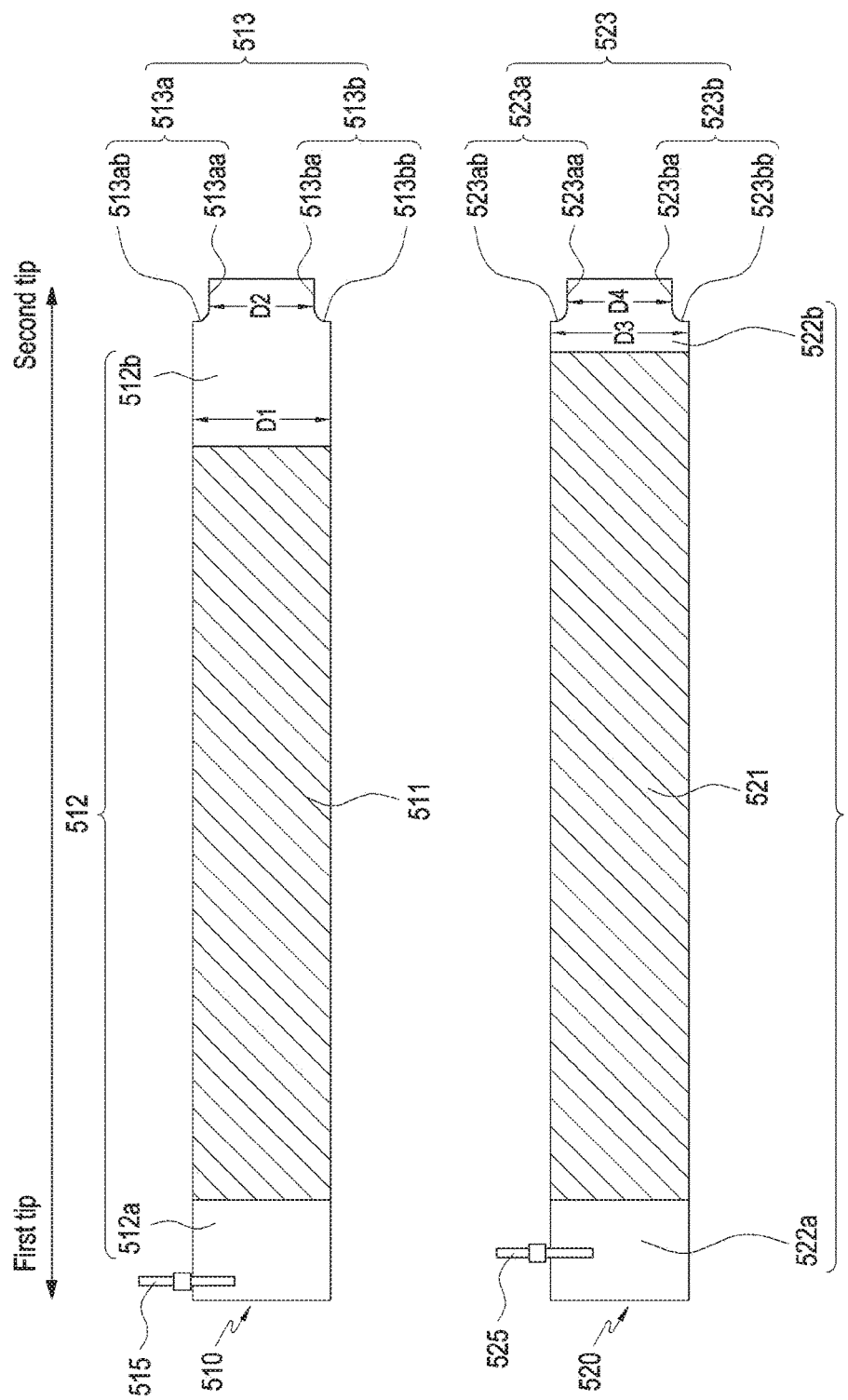
FIG. 7 is a front view illustrating a battery with a negative electrode sheet and a positive electrode sheet unfolded according to an embodiment.

FIG. 7 is a front view illustrating a battery 350 with a negative electrode sheet 510 and a positive electrode sheet 520 unfolded according to an embodiment.

Referring to FIG. 7, a battery 350 may include a negative electrode sheet 510 and a positive electrode sheet 520 that faces the negative electrode sheet 510 with a partitioning film 530 disposed therebetween. The structure of the negative electrode sheet 510, the positive electrode sheet 520, and the partitioning film 530 of the battery 350 of FIG. 7 may be all or partly the same as the structure of the negative electrode sheet 510, the positive electrode sheet 520, and the partitioning film 530 of FIGS. 5 and 6.

The negative electrode sheet 510 may include a base surface formed of a copper (Cu) foil, a negative electrode part 511 resulting from coating the base surface with a negative electrode active material, and a first uncoated part 512 that is free from the negative electrode active material coating. The negative electrode active material of the negative electrode part 511 may be a coating formed in a designated thickness and area and may form substantially the entire surface except for both ends of the negative electrode sheet 510. The first uncoated part 512 may form both ends of the negative electrode sheet 510. A negative electrode tab 515 may be disposed at one end 512a, may protrude to the outside of the negative electrode sheet 510, and may be spaced a predetermined distance apart from, and thus prevented from overlapping, the positive electrode tab 525. The other end 512b of the first uncoated part 512 may include at least one first notch structure 513.

The negative electrode sheet 510 may be a flexible rectangular sheet. The first uncoated part 512 may include a first-first uncoated part 512a formed at a first tip and a first-second uncoated part 512b formed at a second tip. For example, to produce the wrapping-type battery 350, the negative electrode sheet 510 may be wrapped in a circular or elliptical shape with the positive electrode sheet 520 and the partitioning film 530 stacked and using the first-first uncoated part 512a as a start point and the first-second uncoated part 512b as an end point. As another example, the first-first uncoated part 512a may be positioned inside the battery 350, and the first-second uncoated part 512b may be positioned adjacent the outer surface of the battery 350 relative to the first-first uncoated part 512a.

The first-second uncoated part 512b may include at least one first notch structure 513 at a side of an end and formed in such a shape that a side of an end of the first-second uncoated part 512b has been partially removed. As another example, the first notch structure 513 may be a pattern resulting from cutting, to a designated shape, an edge of the first-second uncoated part 512b. The first notch structure 513 may be produced to have a uniform cut surface using a laser so as to minimize metal burrs that are produced when a portion of the negative electrode sheet 510 which is formed of metal copper foil, is cut. As another example, an additional flattening process may be performed on the cut surface or reprocessing may be performed to pattern another particular shape.

There may be provided a plurality of first notch structures 513 including a first-first notch structure 513a resulting from removing a portion of the top end of the first-second uncoated part 512b and a first-second notch structure 513b resulting from removing a portion of the bottom end of the first-second uncoated part 512b. The first-first notch structure 513a may be a pattern resulting from cutting, to a designated shape, a top edge of the first-second uncoated part 512b, and the first-second notch structure 513b may be a pattern resulting from cutting, to a designated shape, a bottom edge of the first-second uncoated part 512b.

The first notch structure 513 may form a designated cutting line portion along the outermost surface of the negative electrode sheet 510 prepared in the wrapped shape. For example, the cutting line portion of the first-first notch structure 513a may be patterned along the outermost surface of the negative electrode sheet 510 of the first-second uncoated part 512b. At least a portion of the cutting line portion may have a first portion 513aa of a first length disposed along a direction perpendicular to the lengthwise direction of the battery 350 and a second portion 513ab of a second length extending from the first portion 513aa to an end meeting the first-second uncoated part 512b The first portion 513aa may be longer than the second portion 513ab, which may be bent or inclined to the upper end of first-second uncoated part 512b.

As another example, the cutting line portion of the first-second notch structure 513b may be patterned along the outermost surface of the negative electrode sheet 510 of the first-second uncoated part 512b, and may have at least a first portion 513ba of a first length disposed along a direction perpendicular to the lengthwise direction of the battery 350 and a second portion 513bb of a second length extending from the first portion 513ba to an end meeting the first-second uncoated part 512b. The first portion 513ba may be longer than the second portion 513bb, which may be bent or inclined to the lower end of first-second uncoated part 512b.

The first notch structure 513 formed in the negative electrode sheet 510 is prevented from exposure to the outside by the partitioning film 530 laid on the outer surface.

The portion where the first notch structure 513 is formed may reduce the width of the first-second uncoated part 512b. For example, as compared with the width D1 of the first-second uncoated part 512b which excludes the first notch structure 513, the width D2 of the first-second uncoated part 512b which includes the first notch structure 513 may be reduced by about 1% to about 30%, or by about 5% to about 15%. The width D2 of the first-second uncoated part 512b with the notch structure 513 may be about 0.5% to about 15% reduced at the top and bottom. As another example, when the width D1 of the first-second uncoated part 512b is about 100 mm, the horizontal and vertical lengths of the first notch structure 513a or 513b may be about at least 1 mm.

The first-first notch structure 513a and the first-second notch structure 513b disposed in the negative electrode sheet 510 may have different sizes. For example, a first portion 513aa of a first length and a second portion 513ab of a second length formed along the cutting line portion of the first-first notch structure 513a may differ from a first portion 513ba of a first length and a second portion 513bb of a second length formed along the cutting line portion of the first-second notch structure 513b.

The positive electrode sheet 520 may have a length or area corresponding to the negative electrode sheet 510 and may include a base surface formed of an aluminum (Al) foil, a positive electrode part 521 resulting from coating the base surface with a positive electrode active material, and a second uncoated part 522 that is free from the positive electrode active material coating. The positive electrode active material of the positive electrode part 521 may be a coating formed in a designated thickness and area and may form substantially the entire surface except for both ends of the positive electrode sheet 520. The second uncoated part 522 may form both ends of the positive electrode sheet 520. A positive electrode tab 525 may be disposed at one end of the positive electrode part 521 and may protrude to the outside of the positive electrode sheet 520. The other end of the positive electrode part 521 may include at least one second notch structure 523.

The positive electrode sheet 520 may be a flexible rectangular sheet. The second uncoated part 522 may include a second-first uncoated part 522a formed at a first tip and a second-second uncoated part 522b formed at a second tip. For example, to produce the wrapping-type battery 350, the positive electrode sheet 520 may be wrapped in a circular or elliptical shape with the negative electrode sheet 510 and the partitioning film 530 stacked and using the second-first uncoated part 522*a* as a start point and the second-second uncoated part 522*b* as an end point. As another example, the second-first uncoated part 522*a* may be positioned inside the battery 350, and the second-second uncoated part 522*b* may be positioned on the outer surface of the battery 350.

The second-second uncoated part 522*b* may include at least one second notch structure 523 at a side of an end in such a shape that a side of an end of the second-second uncoated part 522*b* has been removed. As another example, the second notch structure 523 may be a pattern resulting from cutting, to a designated shape, an edge of the second-second uncoated part 522*b*. The second notch structure 523 may be produced to have a uniform cut surface using a laser so as to minimize metal burrs that are produced when a portion of the positive electrode sheet 520 which is formed of metal, is cut. As another example, an additional flattening process may be performed on the cut surface or reprocessing may be performed, to pattern another particular shape.

There may be provided a plurality of second notch structures 523 including a second-first notch structure 523*a* resulting from removing a portion of the top end of the second-second uncoated part 522*b* and a second-second notch structure 523*b* resulting from removing a portion of the bottom end of the second-second uncoated part 522*b*. The second-first notch structure 523*a* may be a pattern resulting from cutting, to a designated shape, a top edge of the second-second uncoated part 522*b*, and the second-second notch structure 523*b* may be a pattern resulting from cutting, to a designated shape, a bottom edge of the second-second uncoated part 522*b*.

The second notch structure 523 may form a designated cutting line portion along the outermost surface of the positive electrode sheet 520 prepared in the wrapped shape. For example, the cutting line portion of the second notch structure 523 may be patterned along the outermost surface of the positive electrode sheet 520 of the second-second uncoated part 522*b*. At least a portion of the cutting line portion may have a third portion 523*aa* disposed along a direction perpendicular to the lengthwise direction of the battery 350 and a fourth portion 523*ab* extending from the third portion 523*aa* to an end of the positive electrode part 521. The third portion 523*aa* may be larger than the fourth portion 523*ab*. As another example, the fourth portion 523*ab* of the cutting line portion may be bent or inclined to the upper end.

As another example, the cutting line portion of the second-second notch structure 523*b* may be patterned along the outermost surface of the positive electrode sheet 520 of the second-second uncoated part 522*b*. At least a portion of the cutting line portion may have a third portion 523*ba* disposed along a direction perpendicular to the lengthwise direction of the battery 350 and a fourth portion 523*bb* extending from the third portion 523*ba* to an end of the second-second uncoated part 522*b*. The third portion 523*ba* may be longer than the fourth portion 523*bb*, which may be bent or inclined to the lower end of the second-second uncoated part 522*b*.

The second notch structure 523 formed in the positive electrode sheet 520 may be exposed to the outside of the battery.

The portion where the second notch structure 523 is formed may reduce the width of the second-second uncoated part 522*b*. For example, as compared with the width D3 of the second-second uncoated part 522*b* which excludes the second notch structure 523, the width D4 of the second-second uncoated part 522*b* which includes the second notch structure 523 may be reduced by about 1% to about 30%, or by about 5% to about 15%. The width D4 of the second-second uncoated part 522*b* with the notch structure 513 may be about 0.5% to about 15% reduced at the top and bottom. As another example, when the width D3 of the second-second uncoated part 522*b* is about 100 mm, the horizontal and vertical lengths of the second notch structure 523*a* or 523*b* may be about at least 1 mm.

The second-first notch structure 523*a* and the second-second notch structure 523*b* disposed in the positive electrode sheet 520 may have different sizes. For example, the third portion 523*aa* and the fourth portion 523*ab* formed along the cutting line portion of the second-first notch structure 523*a* may differ from the third portion 523*ba* and the fourth portion 523*bb* formed along the cutting line portion of the second-second notch structure 523*b*.

Although the foregoing description regards an example in which the first notch structure 513 is formed in the negative electrode sheet 510 and the second notch structure 523 is formed in the positive electrode sheet 520, embodiments of the disclosure are not limited thereto. For example, the first notch structure 513 may be formed in the negative electrode sheet 510, and no notch structure may be formed in the positive electrode sheet 520. As another example, the second notch structure 523 may be formed in the positive electrode sheet 520 but no notch structure may be formed in the negative electrode sheet 510.

Figure 8:
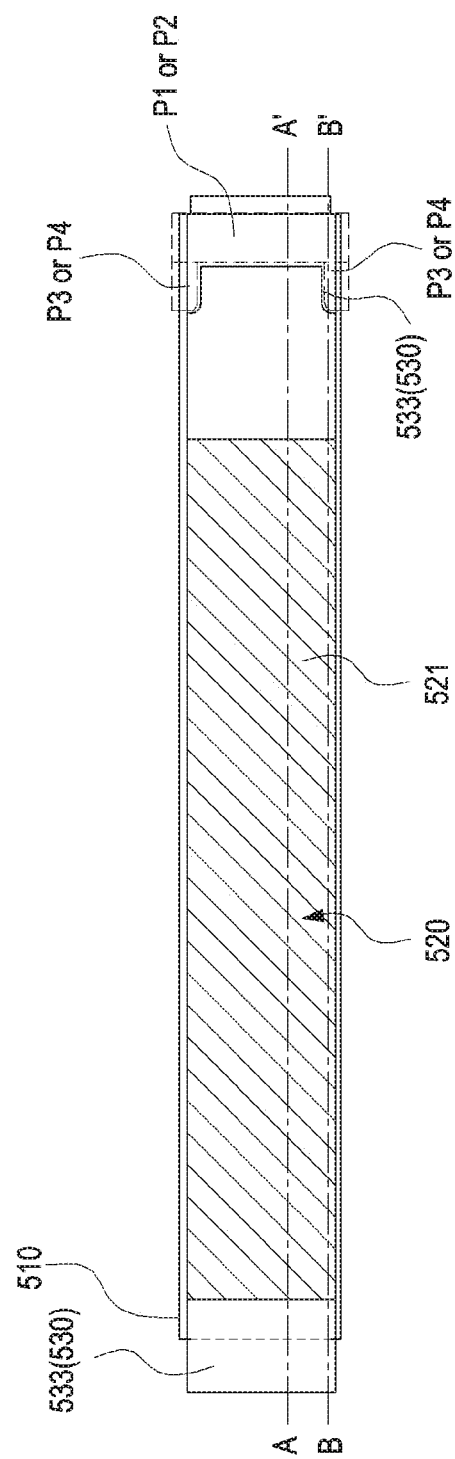
FIG. 8 illustrates a stack of a negative electrode sheet, a partitioning film, and a positive electrode sheet which constitute a battery, according to an embodiment.
Figure 9:
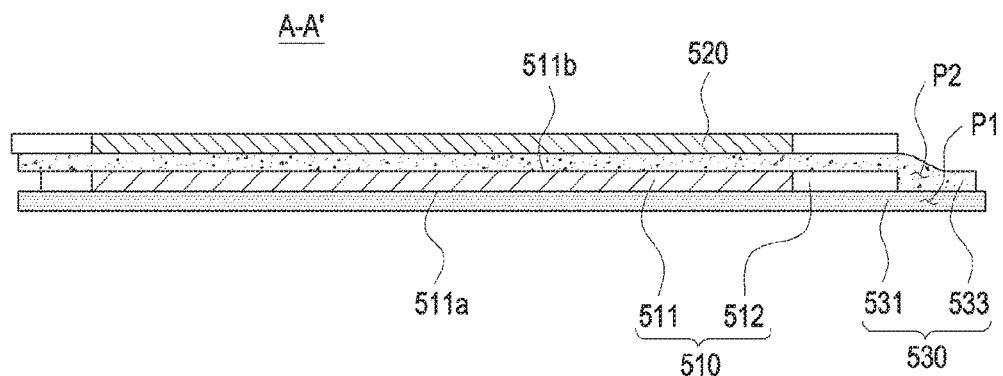
FIG. 9 is a cross-sectional view taken along line A-A' of FIG. 8.
Figure 10:
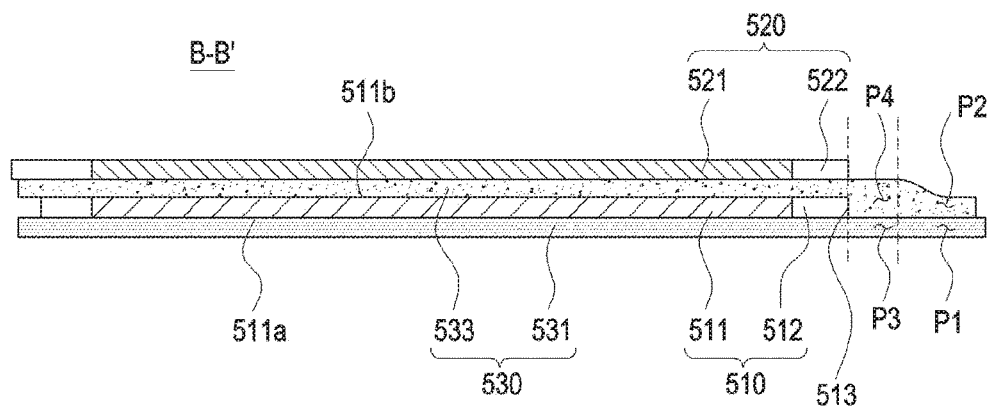
FIG. 10 is a cross-sectional view taken along line B-B' of FIG. 8.

FIG. 8 illustrates a stack of a negative electrode sheet 510, a partitioning film 530, and a positive electrode sheet 520 which constitute a battery, according to an embodiment. FIG. 9 is a cross-sectional view taken along line A-A' of FIG. 8. FIG. 10 is a cross-sectional view taken along line B-B' of FIG. 8.

Referring to FIGS. 8, 9 and 10, a battery 350 may include a negative electrode sheet 510 and a positive electrode sheet 520 that faces the negative electrode sheet 510 with a partitioning film 530 disposed therebetween. The structure of the negative electrode sheet 510, the positive electrode sheet 520, and the partitioning film 530 of the battery 350 of FIGS. 8, 9 and 10 may be entirely or substantially the same as the structure of the negative electrode sheet 510, the positive electrode sheet 520, and the partitioning film 530 of FIGS. 5 and 6.

The battery 350 may include the positive electrode sheet 520, the negative electrode sheet 510 facing the positive electrode sheet 520, and a plurality of partitioning films 530 disposed between the negative electrode sheet 510 and the positive electrode sheet 520 and on one surface of the negative electrode sheet 510. For example, a first partitioning film 531, the negative electrode sheet 510, a second partitioning film 533, and the positive electrode sheet 520 may be sequentially stacked from the inside to outside of the battery 350.

Referring to FIG. 8, in the electrode assembly, the first partitioning film 531, the negative electrode sheet 510, the second partitioning film 533, and the positive electrode sheet 520 may be produced in sizes corresponding to each other, stacked one over another in an unfolded state, and then wrapped into a designated battery in a jelly roll-type manner There may be provided a plurality of partitioning films 530 that include the first partitioning film 531 and the second partitioning film 533 which may be formed of the same material and may include an adhesive (e.g., a binder component). The first partitioning film 531 may support the negative electrode sheet 510, and the second partitioning film 533 may prevent a contact, and resultantly a short circuit, between the negative electrode sheet 510 and the positive electrode sheet 520.

The negative electrode sheet 510 may be disposed between the first partitioning film 531 and the second partitioning film 533, which may correspond in area to each other and may be larger in area than the negative electrode sheet 510. For example, the first partitioning film 531 may be longer than the negative electrode sheet 510. The negative electrode part 511, which is coated with an active material, and the uncoated part 512, which is free from the active material coating, on the first surface 511a of the negative electrode sheet 510 may be attached to each other by an adhesive polymer of the first partitioning film 531. As another example, the second partitioning film 533 may be longer than the negative electrode sheet 510. The negative electrode part 511, which is coated with an active material, and the second uncoated part 522, which is free from the active material coating, on the second surface 511b of the negative electrode sheet 510 may be attached to each other by the adhesive polymer of the second partitioning film 533.

The first partitioning film 531 and the second partitioning film 533 may be larger in area than the negative electrode sheet 510 and be attached together. For example, a first-first area P1 which corresponds to an end of the first partitioning film 531 and a second-first area P2 which corresponds to an end of the second partitioning film 533 may overlap each other and be attached together to prevent an end of the negative electrode sheet 510 disposed inside from exposure to the outside.

A first notch structure 513 formed in the negative electrode sheet 510 may provide an increased attaching area between the first partitioning film 531 and the second partitioning film 533 and may be of a shape in which a side of an end of the first uncoated part 512 has been removed or be a pattern resulting from cutting, to a designated shape, an edge of the first uncoated part 512. The first notch structure 513 may form a designated cutting line portion along the outermost surface of the negative electrode sheet 510 prepared in the wound shape.

The first notch structure 513 enables a facing-and-attaching between the first-second area P3, which is disposed adjacent the first-first area P1 of the first partitioning film 531, and the second-second area P4, which is disposed adjacent the second-first area P2 of the second partitioning film 533. The formation of the first notch structure 513 may result in a reduction in the area of the first uncoated part 512 of the negative electrode sheet 510 along the cutting line portion and an increase in the contacting area between the first partitioning film 531 and the second partitioning film 533. Since the first notch structure 513 is formed in an upper end or lower end of the first uncoated part 512, the first partitioning film 531 and the second partitioning film 533 may be disposed to wrap around the upper or lower end of the first uncoated part 512.

The first partitioning film 531 and second partitioning film 533 which wraps around the negative electrode sheet 510 may be disposed in contact with each other and be strongly bonded together by the binder component. Since the attaching between the uncoated part of the negative electrode sheet 510 and the first partitioning film 531 or the second partitioning film 533 is weaker than the bonding between the uncoated part and the partitioning film or negative electrode part 511 of the negative electrode sheet 510, the uncoated part may be peeled off by an impact. However, the direct contact between the first partitioning film 531 and the second partitioning film 533 affords rigidity to the electrode assembly.

The negative electrode sheet 510 may be wrapped around its top and bottom, as well as its side, by the two partitioning films 531 and 533. For example, a substantially air-tight sealing may be provided in the area adjacent the notch structure of the negative electrode sheet 510, reducing the likelihood of a short circuit inside the battery. Moreover, resistance to negative impact by a fall is reduced as the distance between the contacting area and the negative electrode part 511 reduces and the contacting area increases.

Figure 11:
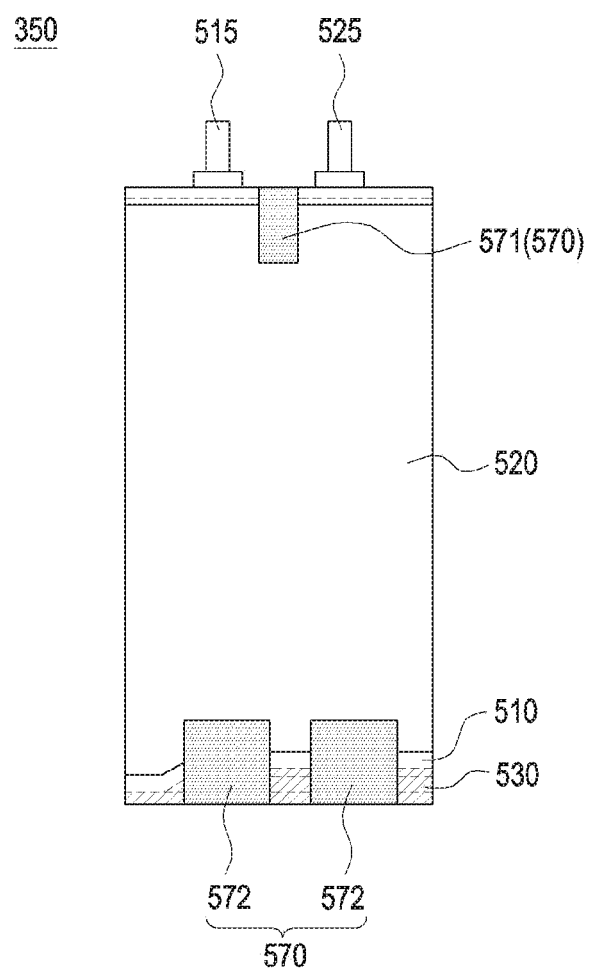
FIG. 11 is a front view illustrating attaching members disposed on an outer surface of a battery according to an embodiment.

FIG. 11 is a front view illustrating attaching members 570 disposed on an outer surface of a battery 350 according to an embodiment.

Referring to FIG. 11, a battery 350 may include a negative electrode sheet 510 and a positive electrode sheet 520 that faces the negative electrode sheet 510 with a partitioning film 530 disposed therebetween. The structure of the negative electrode sheet 510, the positive electrode sheet 520, and the partitioning film 530 of the battery 350 of FIG. 11 may be entirely or substantially the same as the structure of the negative electrode sheet 510, the positive electrode sheet 520, and the partitioning film 530 of FIGS. 5 and 6.

The battery 350 may have at least one attaching member 570 to provide more resistance to external impacts. The attaching members 570 may be disposed along the stack surface of the negative electrode sheet 510, the positive electrode sheet 520, and the partitioning film 530 to provide a strong bonding with the negative electrode sheet 510, the positive electrode sheet 520, and the partitioning film 530.

The attaching members 570 may include at least one first attaching member 571 formed at the top of the battery 350 and at least one second attaching member 572 formed at the bottom of the battery 350, which may have the first partitioning film 531, the negative electrode sheet 510, the second partitioning film 533, and the positive electrode sheet 520 sequentially stacked from the inside to outside. The side of the stack surface may implement a robust structure by the attaching of the first partitioning film 531 and the second partitioning film 533. The attaching members 570 may be disposed to wrap around the top or bottom of the stack surface, preventing a separation, inter-layer warping or floating of the stack surface.

According to an embodiment, a battery may comprise a negative electrode sheet including a negative electrode part coated with a negative electrode active material and a first uncoated part disposed adjacent the negative electrode part, a positive electrode sheet facing the negative electrode sheet and including a positive electrode part coated with a positive electrode active material and a second uncoated part disposed adjacent the positive electrode part, and at least one partitioning film disposed on a surface of the negative electrode sheet or a surface of the positive electrode sheet. The positive electrode sheet, the negative electrode sheet, and the partitioning film may be prepared in a roll shape formed by wrapping. At least a portion of the first uncoated part of the negative electrode sheet or the second uncoated part of the positive electrode sheet may include at least one notch structure internally recessed.

The first uncoated part and the second uncoated part may be disposed in a horizontal direction with respect to a wrapping direction of the battery. A first notch structure formed in the first uncoated part may be disposed in at least a portion of an upper or lower end of the first uncoated part.

The at least one partitioning film may include a first partitioning film disposed on a first surface of the negative electrode sheet and including an adhesive and a second partitioning film disposed between a second surface of the negative electrode sheet and the positive electrode sheet and including an adhesive. A first area of the first partitioning film and a second area of the second partitioning film corresponding to the first notch structure may be attached to each other by the adhesives.

A wrapping structure formed by the positive electrode sheet, the negative electrode sheet, and the partitioning films may be formed in a jelly roll type. The first notch structure may be formed in a designated pattern along an outermost surface of the negative electrode sheet.

The notch structure formed in the first uncoated part or the second uncoated part may include a cutting line portion. At least a portion of the cutting line portion may be formed along a direction perpendicular to a lengthwise direction of the battery.

The cutting line portion of the notch structure may include a bend or an inclination towards an end of the first uncoated part or the second uncoated part.

The cutting line portion of the notch structure may include a first length formed in a lengthwise direction of the negative electrode sheet and a second length extending from the first length to an upper or lower end of the negative electrode sheet. The second length may correspond to 1% to 30% of a width of the first uncoated part.

The first partitioning film and the second partitioning film may have sizes corresponding to each other and be larger in area than the negative electrode sheet.

The negative electrode sheet may include a first-first uncoated part having a protruding negative electrode tab and a first-second uncoated part having the first notch structure and spaced apart from the first-first uncoated part with the negative electrode part disposed therebetween. The first notch structure may be prepared in such a shape that at least a portion of an edge of the first-second uncoated part has been cut and patterned.

The first notch structure may include a first-first notch structure formed in an upper edge of the first-second uncoated part and a first-second notch structure formed in a lower edge of the first-second uncoated part.

The positive electrode sheet may include a second-first uncoated part having a protruding positive electrode tab and a second-second uncoated part having a second notch structure and spaced apart from the second-first uncoated part with the positive electrode part disposed therebetween. The second notch structure may be prepared in such a shape that at least a portion of an edge of the second-second uncoated part has been cut and patterned.

The second notch structure may include a second-first notch structure formed in an upper edge of the second-second uncoated part and a second-second notch structure formed in a lower edge of the second-second uncoated part.

The positive electrode sheet, the second partitioning film, the negative electrode sheet, and the first partitioning film may form a stacked electrode assembly so that the positive electrode sheet is exposed at an outermost edge. At least one attaching member may be disposed on a stack surface of the electrode assembly.

The at least one attaching member may include a first attaching member formed to wrap at least a portion of an upper end of the stack surface of the battery and a second attaching member formed to wrap at least a portion of a lower end of the stack surface of the battery.

The battery may further comprise a pouch. The electrode assembly may be received in the pouch to be sealed off from the outside.

According to an embodiment, an electronic device may comprise a housing including a front plate facing in a first direction, a rear plate facing in a second direction opposite to the first direction, and a bracket formed to surround a space between the front plate and the rear plate, a display configured to externally display information through at least a portion of the front plate, and a battery mounted in a seating hole prepared in at least a portion of a first surface facing in the first direction of the bracket. The battery may comprise a negative electrode sheet including a negative electrode part coated with a negative electrode active material and a first uncoated part disposed adjacent the negative electrode part, a positive electrode sheet facing the negative electrode sheet and including a positive electrode part coated with a positive electrode active material and a second uncoated part disposed adjacent the positive electrode part, and at least one partitioning film disposed on a surface of the negative electrode sheet or a surface of the positive electrode sheet. At least a portion of the first uncoated part of the negative electrode sheet or the second uncoated part of the positive electrode sheet may include at least one internally recessed notch structure.

The positive electrode sheet, the negative electrode sheet, and the at least one partitioning film may be prepared in a roll shape formed by wrapping. The first uncoated part and the second uncoated part may be disposed in a direction parallel to a direction of the wrapping.

A first notch structure formed in the first uncoated part may be disposed in at least a portion of an upper end or lower end of the first uncoated part.

The at least one partitioning film may include a first partitioning film disposed on a first surface of the negative electrode sheet and including an adhesive and a second partitioning film disposed between a second surface of the negative electrode sheet and the positive electrode sheet and including an adhesive. A first area of the first partitioning film and a second area of the second partitioning film corresponding to the first notch structure may be attached to each other by the adhesives.

The notch structure formed in the first uncoated part or the second uncoated part may include a first length formed in a lengthwise direction of the negative electrode sheet and a second length extending from the first length to an upper or lower end of the negative electrode sheet. The notch structure may include a bent or inclined line from the first length to the second length.

As is apparent from the foregoing description, a battery mounted in an electronic device has a notch structure patterned in an uncoated part of a positive electrode sheet or negative electrode sheet, reinforcing the bond between the partitioning films.

A battery mounted in an electronic device may provide a robust structure against external stress by a reinforced attaching between partitioning films, balance charged energy in the battery cells and stabilize battery performance.

A battery mounted in an electronic device may be implemented with a robust structure against external impacts or drops, and may be enhanced in terms of stability and susceptibility to product liability.

A battery mounted in an electronic device enables electronic parts to have a stable performance and enables the electronic device to be made lightweight and compact.

Embodiments as set forth herein may be implemented as software including one or more instructions that are stored in a storage medium that is readable by a machine, i.e., and electronic device. For example, a processor of the machine may invoke and execute at least one of the one or more instructions stored in the storage medium, with or without using one or more other components under the control of the processor, thereby enabling the machine to be operated to perform at least one function according to the at least one instruction invoked.

The one or more instructions may include a code generated by a complier or a code executable by an interpreter. The machine-readable storage medium may be provided in the form of a non-transitory storage medium. The term "non-transitory" indicates that the storage medium is a tangible device, and does not include a signal (e.g., an electromagnetic wave), but does not differentiate between where data is semi-permanently and temporarily stored in the storage medium.

A method according to embodiments of the disclosure may be included and provided in a computer program product which may be traded as commodities between sellers and buyers and distributed in the form of a machine-readable storage medium (e.g., compact disc read only memory (CD-ROM)), or may be downloaded or uploaded online via an application store (e.g., Play Store™), or directly between two user devices. If distributed online, at least part of the computer program product may be temporarily generated or at least temporarily stored in the machine-readable storage medium, such as memory of the manufacturer's server, a server of the application store, or a relay server.

Each component of the above-described components may include a single entity or multiple entities. One or more of the above-described components may be omitted, or one or more other components may be added. Alternatively or additionally, a plurality of components may be integrated into a single component. In such a case, the integrated component may still perform one or more functions of each of the plurality of components in the same or similar manner as they are performed by a corresponding one of the plurality of components before the integration. Operations performed by the module, the program, or another component may be performed sequentially, in parallel, repeatedly, or heuristically, one or more of the operations may be executed in a different order or omitted, or other operations may be added.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A battery, comprising:
   a negative electrode sheet including a negative electrode part coated with a negative electrode active material and a first uncoated part disposed adjacent to the negative electrode part;
   a positive electrode sheet facing the negative electrode sheet and including a positive electrode part coated with a positive electrode active material and a second uncoated part disposed adjacent to the positive electrode part; and
   at least one partitioning film disposed on a surface of the negative electrode sheet or a surface of the positive electrode sheet,
   wherein the positive electrode sheet, the negative electrode sheet, and the partitioning film include a roll shape formed by wrapping, and
   wherein an upper and a lower portion of the first uncoated part of the negative electrode sheet or the second uncoated part of the positive electrode sheet include at least one internally recessed notch structure.

2. The battery of claim 1,
   wherein the first uncoated part and the second uncoated part are disposed in a parallel direction with respect to a wrapping direction of the battery, and
   wherein a first notch structure formed in the first uncoated part is disposed in at least a portion of an upper end or lower end of the first uncoated part.

3. The battery of claim 2,
   wherein the at least one partitioning film includes a first partitioning film and a second partitioning film, the first partitioning film being disposed on a first surface of the negative electrode sheet and including an adhesive material, and the second partitioning film being disposed between a second surface of the negative electrode sheet and the positive electrode sheet and including the adhesive material, and
   wherein a first area of the first partitioning film and a second area of the second partitioning film corresponding to the first notch structure are attached to each other by the adhesive material.

4. The battery of claim 3,
   wherein a wrapping structure formed by the positive electrode sheet, the negative electrode sheet, and the partitioning films is formed in a jelly roll type manner, and
   wherein the first notch structure includes a designated pattern along an outermost surface of the negative electrode sheet.

5. The battery of claim 3,
   wherein the first partitioning film and the second partitioning film have sizes corresponding to each other and being larger than a size of the negative electrode sheet.

6. The battery of claim 3,
   is wherein the negative electrode sheet includes a first-first uncoated part including a protruding negative electrode tab and a first-second uncoated part including the first notch structure and spaced apart from the first-first uncoated part, the negative electrode part being disposed between the first-first uncoated part and the first-second uncoated part, and
   wherein the first notch structure includes a shape by which at least a portion of an edge of the first-second uncoated part is cut and patterned.

7. The battery of claim 6,
   wherein the first notch structure includes a first-first notch structure formed in an upper edge of the first-second uncoated part and a first-second notch structure formed in a lower edge of the first-second uncoated part.

8. The battery of claim 3,
   wherein the positive electrode sheet includes a second-first uncoated part including a protruding positive electrode tab and a second-second uncoated part including a second notch structure and spaced apart from the second-first uncoated part, the positive electrode part being disposed between the second-first uncoated part and the second-second uncoated part, and
   wherein the second notch structure includes a shape by which at least a portion of an edge of the second-second uncoated part is cut and patterned.

9. The battery of claim 8,
   wherein the second notch structure includes a second-first notch structure formed in an upper edge of the second-second uncoated part and a second-second notch structure formed in a lower edge of the second-second uncoated part.

10. The battery of claim 3,
    wherein the positive electrode sheet, the second partitioning film, the negative electrode sheet, and the first partitioning film form a stacked electrode assembly by which the positive electrode sheet is exposed at an outermost edge of the battery, and wherein at least one attaching member is disposed on a stack surface of the electrode assembly.

11. The battery of claim 10, wherein the at least one attaching member includes a first attaching member formed to wrap at least a portion of an upper end of the stack surface of the battery and a second attaching member formed to wrap at least a portion of a lower end of the stack surface of the battery.

12. The battery of claim 10, further comprising a pouch in which the electrode assembly is received and is sealed off from an outside of the battery.

13. The battery of claim 1, wherein the notch structure formed in the first uncoated part or the second uncoated part includes a cutting line portion, and wherein at least a portion of the cutting line portion is formed along a direction perpendicular to a lengthwise direction of the battery.

14. The battery of claim 13, wherein the cutting line portion of the notch structure includes a bend or an inclination towards an end of the first uncoated part or the second uncoated part.

15. The battery of claim 13, wherein the cutting line portion of the notch structure includes a first length formed in a lengthwise direction of the negative electrode sheet and a second length extending from the first length to an upper end or lower end of the negative electrode sheet, and wherein the second length corresponds to 1% to 30% of a width of the first uncoated part.

16. An electronic device including a battery, the electronic device comprising:

a housing including a front plate facing in a first direction, a rear plate facing in a second direction opposite to the first direction, and a bracket formed to surround a space between the front plate and the rear plate;

a display device configured to externally display information through at least a portion of the front plate; and the battery mounted in a seating hole prepared in at least a portion of a first surface facing in the first direction of the bracket, wherein the battery includes:

a negative electrode sheet including a negative electrode part coated with a negative electrode active material and a first uncoated part disposed adjacent to the negative electrode part;

a positive electrode sheet facing the negative electrode sheet and including a positive electrode part coated with a positive electrode active material and a second uncoated part disposed adjacent to the positive electrode part; and at least one partitioning film disposed on a surface of the negative electrode sheet or a surface of the positive electrode sheet, wherein an upper and a lower portion of the first uncoated part of the negative electrode sheet or the second uncoated part of the positive electrode sheet include at least one internally recessed notch structure.

17. The electronic device of claim 16, wherein the positive electrode sheet, the negative electrode sheet, and the at least one partitioning film are prepared in a roll shape formed by wrapping, and wherein the first uncoated part and the second uncoated part are disposed in a direction parallel to a direction of the wrapping.

18. The electronic device of claim 17, wherein a first notch structure formed in the first uncoated part is disposed in at least a portion of an upper end or lower end of the first uncoated part.

19. The electronic device of claim 18, wherein the at least one partitioning film includes a first partitioning film and a second partitioning film, the first partitioning film being disposed on a first surface of the negative electrode sheet and including an adhesive material, and the second partitioning film disposed between a second surface of the negative electrode sheet and the positive electrode sheet and including the adhesive material, and wherein a first area of the first partitioning film and a second area of the second partitioning film corresponding to the first notch structure are attached to each other by the adhesive material.

20. The electronic device of claim 16, wherein the notch structure formed in the first uncoated part or the second uncoated part includes a first portion of a first length formed in a lengthwise direction of the negative electrode sheet and a second portion of a second length extending from the first portion to an upper or lower end of the negative electrode sheet, and wherein the notch structure includes a structure bent or inclined from the first portion to the second portion.

* * * * *